(12) United States Patent
Cho et al.

(10) Patent No.: US 8,118,021 B2
(45) Date of Patent: Feb. 21, 2012

(54) POUCH PACK CONTROLLING TEMPERATURE

(75) Inventors: Byoung-gu Cho, Cheonan-si (KR); Byoung-kwon Cho, Seoul (KR)

(73) Assignee: Harvest Charmfoods Co., Ltd. (KR)

( * ) Notice: Subject to any disclaimer, the term of this patent is extended or adjusted under 35 U.S.C. 154(b) by 282 days.

(21) Appl. No.: 12/280,431

(22) PCT Filed: Feb. 23, 2007

(86) PCT No.: PCT/KR2007/000959
§ 371 (c)(1),
(2), (4) Date: Aug. 22, 2008

(87) PCT Pub. No.: WO2007/097591
PCT Pub. Date: Aug. 30, 2007

(65) Prior Publication Data
US 2009/0025706 A1    Jan. 29, 2009

(30) Foreign Application Priority Data

Feb. 24, 2006 (KR) .................. 10-2006-0018345
Feb. 24, 2006 (KR) .................. 10-2006-0018346
Nov. 8, 2006 (KR) .................. 10-2006-0110210

(51) Int. Cl.
*F28F 7/00* (2006.01)
*F25D 5/00* (2006.01)

(52) U.S. Cl. ........... 126/263.01; 126/263.09; 126/375.1; 126/263; 383/104; 383/105

(58) Field of Classification Search .. 126/263.1–263.09; 383/104, 105
See application file for complete search history.

(56) References Cited

U.S. PATENT DOCUMENTS

| 3,542,032 | A | * | 11/1970 | Spencer, Jr. | .................. 607/114 |
| 6,116,231 | A | | 9/2000 | Sabin et al. | |
| 6,247,469 | B1 | * | 6/2001 | Guard | .................. 126/263.01 |
| 6,289,889 | B1 | * | 9/2001 | Bell et al. | .................. 126/263.07 |
| 6,393,843 | B2 | * | 5/2002 | Kohout | .................. 62/4 |
| 6,484,514 | B1 | | 11/2002 | Joseph et al. | |
| 6,513,516 | B2 | * | 2/2003 | Sabin et al. | .................. 126/263.01 |
| 6,640,801 | B2 | | 11/2003 | Sabin et al. | |
| 7,021,064 | B2 | * | 4/2006 | Wohland et al. | .................. 62/4 |
| 7,922,984 | B2 | * | 4/2011 | Hamilton et al. | .................. 422/305 |

FOREIGN PATENT DOCUMENTS

| JP | 2002503795 | 2/2002 |
| JP | 2003504285 | 2/2003 |
| JP | 2003525419 | 8/2003 |
| JP | 2004512868 | 4/2004 |

(Continued)

OTHER PUBLICATIONS

Extended European Search Report for application No. 07709084.3-1258/1986533 dated Jan. 12, 2010.

(Continued)

*Primary Examiner* — Steven B McAllister
*Assistant Examiner* — Nikhil Mashruwala
(74) *Attorney, Agent, or Firm* — Cantor Colburn LLP

(57) ABSTRACT

Disclosed is a temperature control pouch pack including: a first pack which is filled with a predetermined reaction fluid and a reaction material that react with each other to cause a certain reaction while isolating one of the reaction fluid and the reaction material from the other one; and a second pack which is disposed to exchange heat with the first pack and accommodates an article of which temperature is in need of control.

18 Claims, 12 Drawing Sheets

FOREIGN PATENT DOCUMENTS

| | | |
|---|---|---|
| JP | 16-534699 | 11/2004 |
| JP | 2005501623 | 1/2005 |
| KR | 20-0300703 | 1/2002 |
| KR | 10-2002-0030785 | 4/2002 |
| KR | 10-2005-0093657 | 9/2005 |
| WO | 0104548 | 1/2001 |
| WO | 0230251 | 4/2002 |
| WO | 03002425 | 1/2003 |

OTHER PUBLICATIONS

International Search Report for corresponding International Application No. PCT/KR2007/000959 dated May 25, 2007.
Chinese Office Action for Application No. 200780006244.9 issued Nov. 16, 2010 with English translation.

* cited by examiner

POUCH PACK CONTROLLING TEMPERATURE

CROSS REFERENCE TO RELATED APPLICATION

This application claims priority to PCT International Application, PCT/KR2006/000959, filed in Feb. 23, 2007 which claims priority to Korean Patent Application Nos. 10-2006-0018345, filed on Feb. 24, 2006, 10-2006-0018346, filed on Feb. 24, 2006 and 10-2006-0110210, filed on Nov. 8, 2006 in the Korean Patent Office and all the benefits accruing therefrom under 35 U.S.C. §119, the contents of which in its entirety are hereby incorporated by reference.

TECHNICAL FIELD

Apparatuses consistent with the present invention relate to a temperature control pouch pack, and more particularly, to a temperature control pouch pack having an improved structure of conveniently heating or cooling an article.

BACKGROUND ART

A temperature control pouch pack is used outdoors to heat or cool an article without additional electronic devices, particularly, used to conveniently heat or cool various beverages and food in winter and summer.

As shown in FIG. 1, a conventional temperature control pouch pack 10 includes an external pack 20 filled with a reaction material which reacts with a reaction fluid, and a reaction fluid pouch 30 placed inside the external pack 20 and filled with the reaction fluid. In the conventional temperature control pouch pack 10, if a user presses it and tears the reaction fluid pouch 30, an endothermic or exothermic reaction arises between the reaction fluid and the reaction material and cools or heats a surface of the temperature control pouch pack, so that the temperature of the article is controlled by making the temperature control pouch pack contact the article.

DISCLOSURE

Technical Problem

However, the conventional temperature control pouch pack 10 with this configuration should be carried separately from the article, so that it is inconvenient to maintenance and use the conventional temperature control pouch pack 10. Further, a user should keep the article in contact with the temperature control pouch pack 10 until the article is cooled or heated to reach a desired temperature, thereby causing inconvenience to him/her. Also, while the article contacts the temperature control pouch pack 10, a relatively long time may be taken to make the article reach the desired temperature according to heat transfer efficiency of a packing material for the temperature control pouch pack 10.

Technical Solution

Accordingly, it is an aspect of the present invention to provide a temperature control pouch pack which is convenient for heating or cooling article.

Also, it is another aspect of the present invention to provide a temperature control pouch pack which has high efficiency of temperature control to make article quickly reach a desired temperature.

Additional aspects of the present invention will be set forth in part in the description which follows and, in part, will be obvious from the description, or may be learned by practice of the present invention.

The foregoing and/or other aspects of the present invention are achieved by providing a temperature control pouch pack including: a first pack which is filled with a predetermined reaction fluid and a reaction material that react with each other to cause a certain reaction while isolating one of the reaction fluid and the reaction material from the other one; and a second pack which is disposed to exchange heat with the first pack and accommodates an article of which temperature is in need of control.

According to an aspect of the invention, the temperature control pouch pack further includes a third pack which is opposite to the first pack with the second pack interposed therebetween, in which the third pack being filed with the reaction fluid and a second reaction material that react with each other to cause a predetermined reaction.

According to an aspect of the invention, the temperature control pouch pack further includes a third pack which communicate with the first pack with the second pack interposed therebetween, in which the third pack being filled with a second reaction fluid that reacts with the reaction fluid flowed out from the first pack and causes a predetermined reaction.

According to an aspect of the invention, the second pack includes an opening through which the article is taken in and out, and the opening is provided at a lower region or a lateral side of the second pack.

According to an aspect of the invention, the first pouch pack and the second pouch pack include reaction fluid pouches to accommodate the reaction fluid, respectively.

According to an aspect of the invention, the reaction fluid pouch includes a tearing member on a surface thereof to be torn by pressure.

According to an aspect of the invention, the first pack and the third pack include pack pouches to accommodate the reaction fluid pouch and the reaction material pouch, and the reaction fluid pouch is formed with a through hole which is interposed between the pack pouches at least one region of an adhesive edge and allows the pack pouches to contact with and adhered to each other.

According to an aspect of the invention, the pack pouches are adhered to each other by one of thermal bonding, high frequency bonding and adhesive.

According to an aspect of the invention, the through hole is plural.

According to an aspect of the invention, the first reaction material and the second reaction material are filled in the reaction material pouch which is capable of absorbing the reaction fluid and is partitioned into a plurality of regions.

According to an aspect of the invention, the first pack includes an outlet hole through which the reaction fluid flows out, and the third pack includes an inlet hole through which the reaction fluid flows in.

According to an aspect of the invention, the outlet hole of the first pack and the inlet hole of the third pack are in contact with each other so that the reaction fluid communicates with the inlet hole via the outlet hole.

According to an aspect of the invention, the temperature control pouch pack further includes a communicating member which connects the outlet hole of the first pack and the inlet hole of the third pack and through which the reaction fluid flows.

According to an aspect of the invention, the temperature control pouch pack further includes a sealing member which is provided around the outlet hole of the first pack and the inlet hole of the third pack and prevents the reaction fluid from leaking while flowing.

According to an aspect of the invention, the first pack and the third pack include an adhesion region where they are adhered to each other, and the outlet hole and the inlet hole are adjacent to the adhesion region.

According to an aspect of the invention, the outlet hole and the inlet hole are placed in lower regions of the first pack and the third pack.

According to an aspect of the invention, the certain reaction is an endothermic reaction, and the first reaction material and the second reaction material include at least one of ammonium nitrate ($NH_4NO_3$) and sodium acetate (NaOAc).

According to an aspect of the invention, the first reaction material and the second reaction material include urea.

According to an aspect of the invention, the certain reaction is an exothermic reaction, and the first reaction material and the second reaction material include at least one of a metallic heating element and calcium oxide.

DESCRIPTION OF DRAWINGS

The above and/or other aspects of the present invention will become apparent and more readily appreciated from the following description of the embodiments, taken in conjunction with the accompany drawings of which.

BEST MODE

Figure 1:
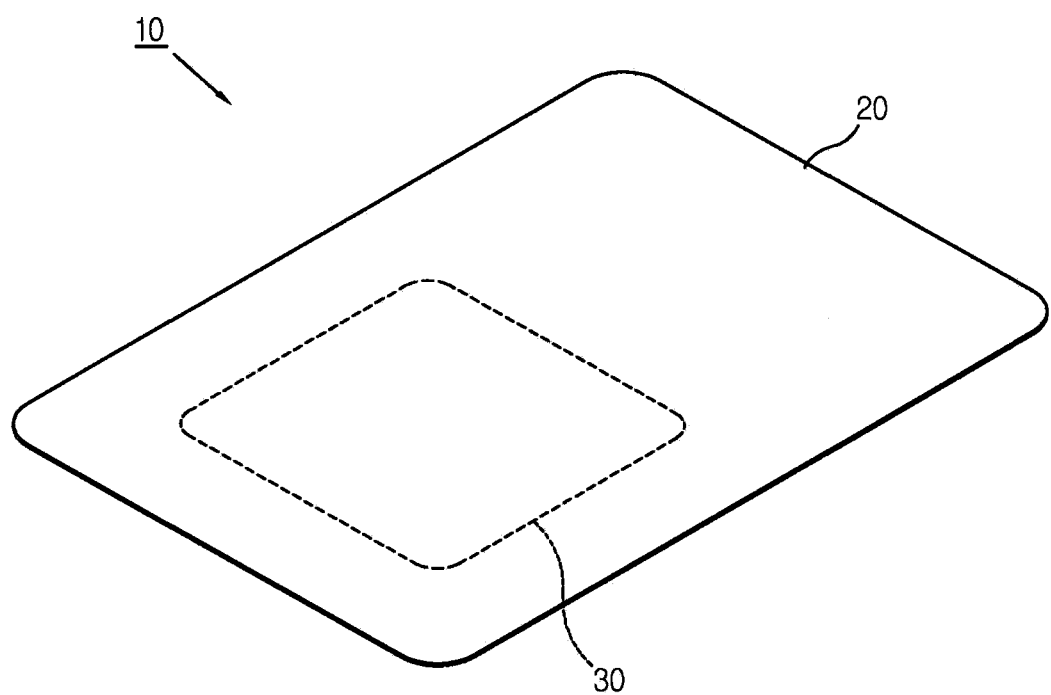
FIG. 1 is a schematic view showing a configuration of a conventional temperature control pouch pack.
Figure 2:
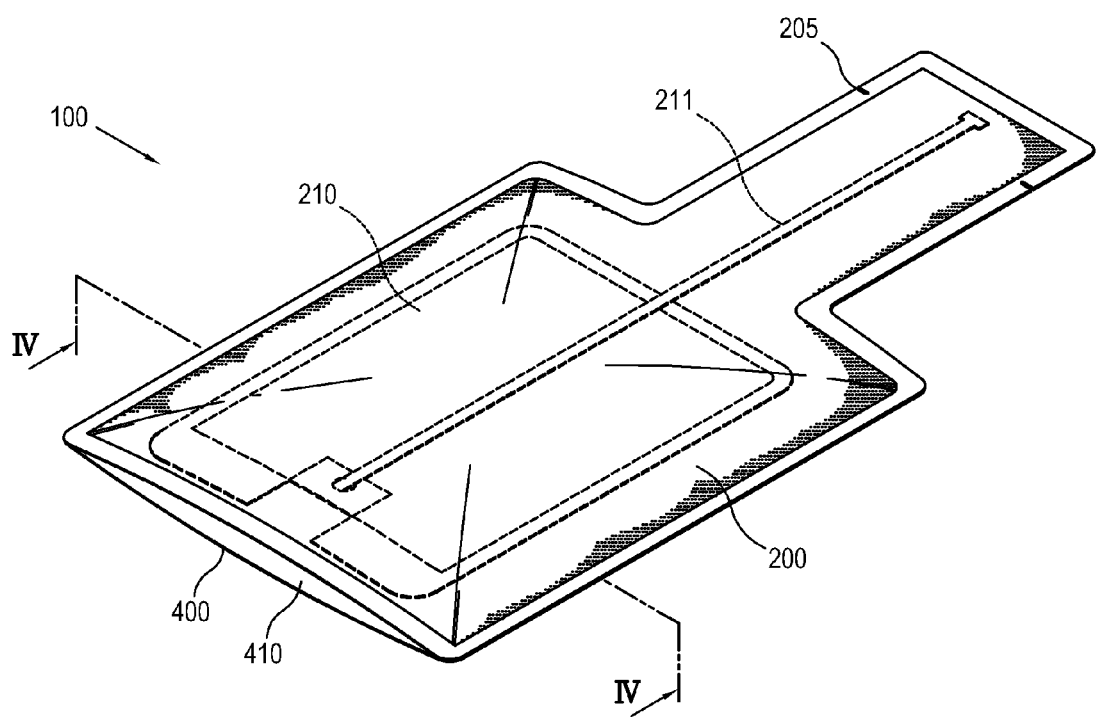
FIG. 2 is a perspective view of a heating pack unit according to an exemplary embodiment of the present invention.
Figure 3:
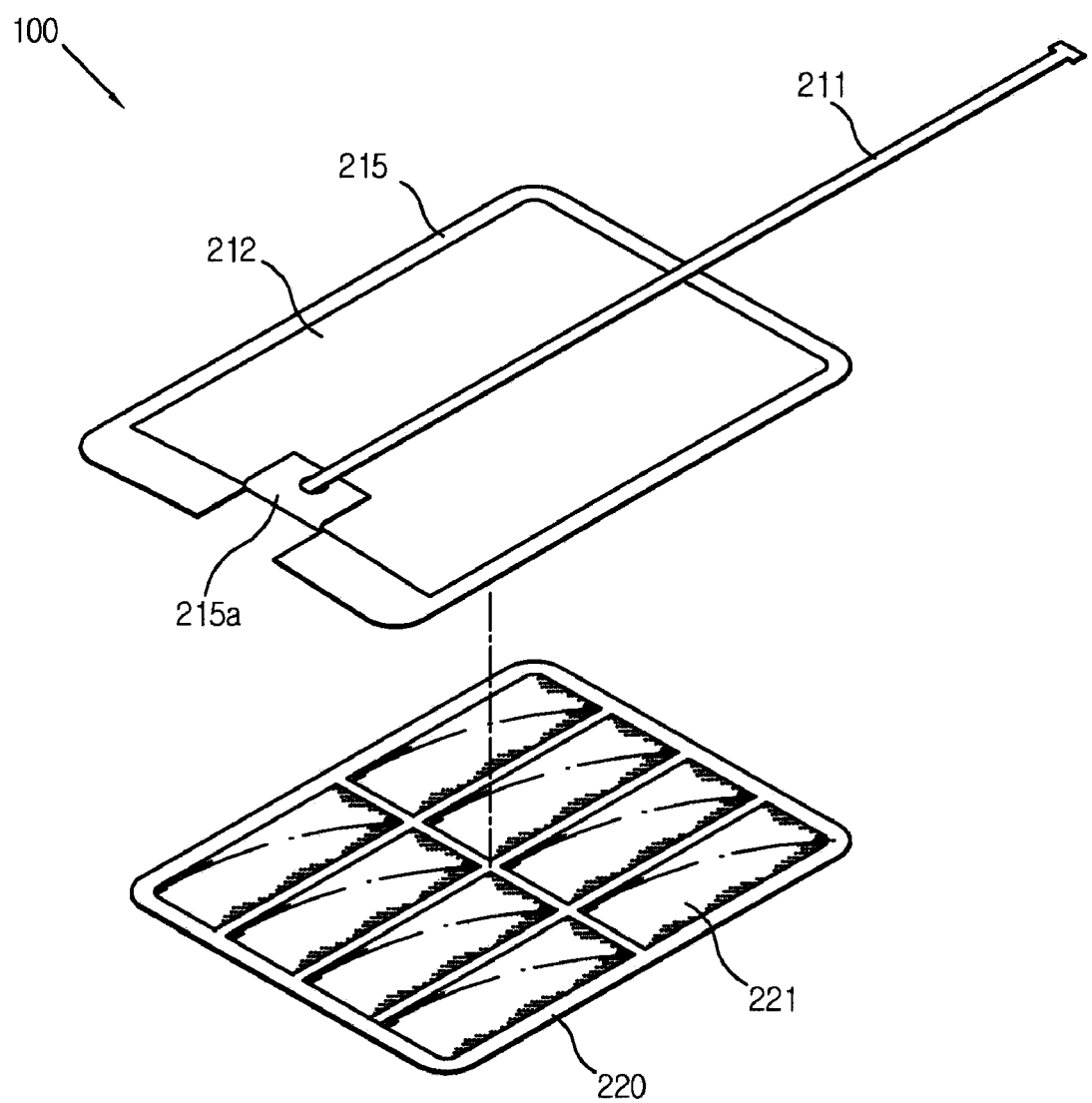
FIG. 3 is an exploded perspective view showing an interior configuration of FIG. 2.
Figure 4:
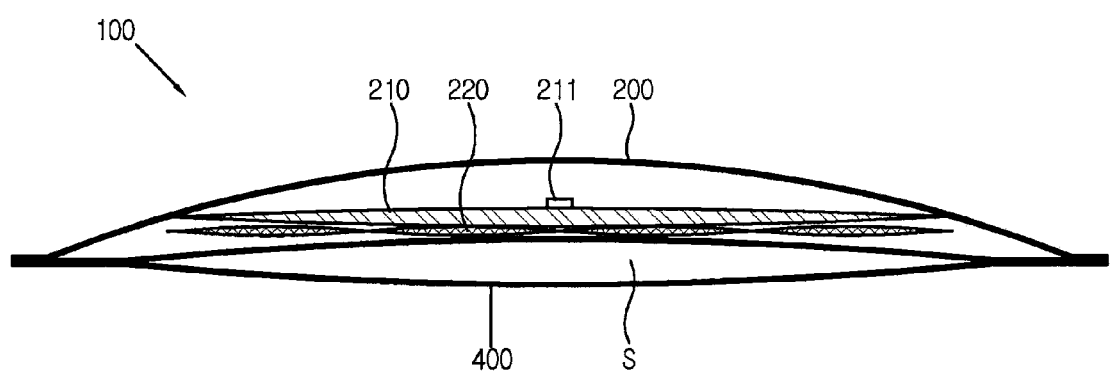
FIG. 4 is a sectional view taken along line IV-IV of FIG. 2.
Figure 5:
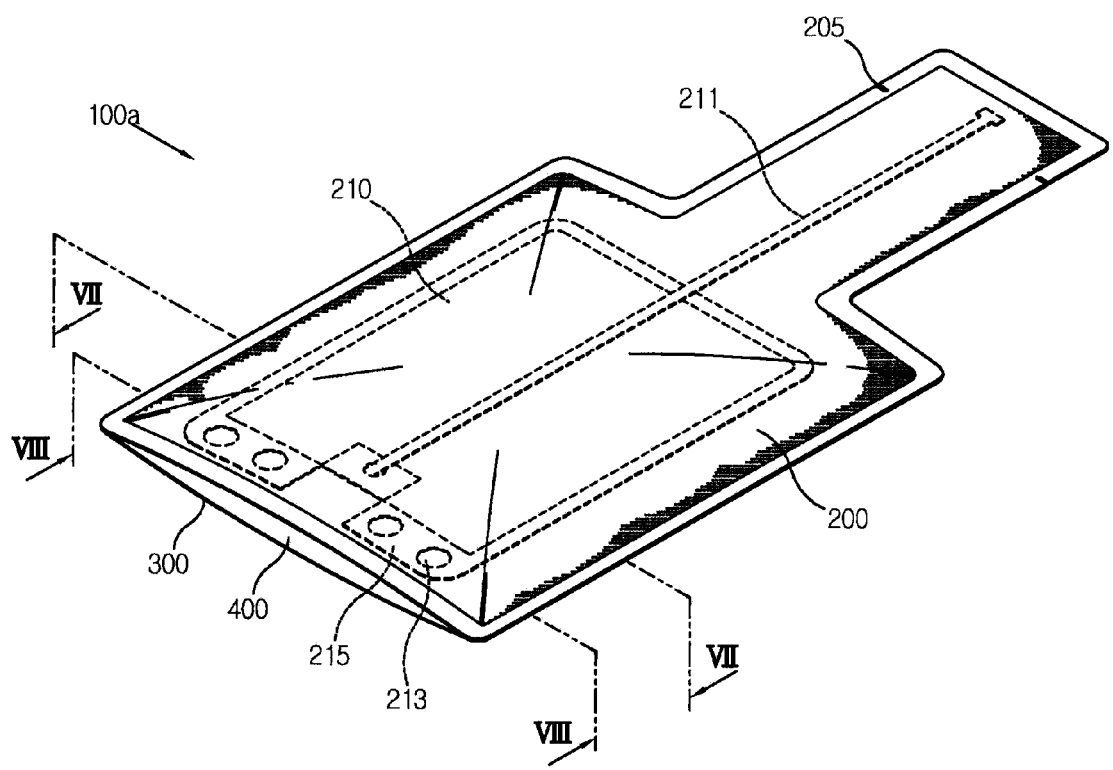
FIG. 5 is a perspective view showing a configuration of a temperature control pouch pack according to a second exemplary embodiment of the present invention.

FIGS. 2 through 4 are a perspective view and a sectional view that illustrate a configuration of a temperature control pouch pack 100 according to a first exemplary embodiment of the present invention. As shown therein, the temperature control pouch pack 100 according to the first exemplary embodiment of the present invention includes a first pack 200 which accommodates a reaction fluid pouch 210 to store a reaction fluid and a reaction material pouch 220 to store a reaction material, and a second pack 400 which is disposed to exchange heat with the first pack 200 and contains article to be cooled and heated by endothermic and exothermic reactions between the reaction material and the reaction fluid.

The reaction fluid pouch 210 stores the reaction fluid therein to chemical-react with the reaction material. The reaction fluid may be changed according to the endothermic reaction, the exothermic reaction, and kinds of the reaction material. In general, water is used as the reaction fluid. In the case of the exothermic reaction, NaCl water solution may be used as the reaction fluid Further, the reaction fluid may include an additive to control its melting point (freezing point), and a catalyst to control its reaction rate. For example, in the case of the exothermic reaction, $MgCl_2$ may be added to the reaction fluid (i.e., water) so that the freezing point of water is lowered, thereby preventing the reaction fluid from being easily frozen at a relatively low temperature region.

The reaction fluid pouch 210 is provided with a tearing member 211 on one side thereof to make the reaction fluid flow out of the reaction fluid pouch 210 and react with the reaction material of the reaction material pouch 220. The tearing member 211 is connected to a cutting part 215 a cut from an edge 215 of the reaction fluid pouch 210, and tears the reaction fluid pouch 210 when a user pulls it outward, thereby reacting the reaction fluid with the reaction material. Alternatively, another means may be used instead of the tearing member 211 shown in FIG. 3 as long as it tears the reaction fluid pouch 210 and makes the reaction fluid react with the reaction material.

For example, according to an exemplary embodiment of the present invention, a user can tear the reaction fluid pouch 210 by pressing the temperature control pouch pack 100 at both sides without a separate tearing member 211, thereby causing the chemical reaction. At this time, the edge 215 of the reaction fluid pouch 210 may be sealed with a weak force to thereby allow a user to easily tear the reaction fluid pouch 210.

The reaction fluid pouch 210 protects the reaction fluid from damage due to external shock and isolates the reaction material from the reaction fluid. The reaction fluid pouch 210 is manufactured with a packing material which has a plurality of layers. The packing material may include one of linear-low density polyethylene (LLDPE), nylon (NY), aluminum foil (Al), and easy-cut nylon (EZ.NY). The reaction fluid pouch 210 is filled with the reaction fluid in a reaction fluid storing area 212, and sealed by heat in the other area.

Meanwhile, the reaction fluid pouch 210 may be replaced with any means as long as it can store the fluid.

The reaction material pouch 220 accommodates the reaction material as shown in FIG. 3. Here, the reaction material pouch 220 may be made of a textile non-woven fabric, a pulp non-woven fabric, a foaming resin sheet, etc. to absorb the reaction fluid and adjust a reaction time of the reaction material. Further, the reaction material pouch 220 may be partitioned into predetermined areas to prevent the reaction material from making a lump during custody. Accordingly, the reaction material is stored in each partitioned area 221 as shown in FIG. 3.

It is preferable but not necessary that the reaction material pouch 220 is coupled to the first pack 200 in order to keep its position while the reaction material reacts with the reaction fluid. Particularly, the reaction material pouch 220 is coupled to a center region of the first pack 200, where a surface to contact the article is relatively large, so as to increase heat transfer efficiency for the article contained in the second pack 400.

To heat the article, the reaction material employs a heating agent for causing the exothermic reaction with the reaction fluid. For example, the heating element includes metal such as magnesium (Mg) and iron (Fe), or calcium oxide.

On the other hand, to cool the article, the reaction material employs a cooling agent for causing the endothermic reaction with the reaction fluid. For example, the cooling agent includes ammonium nitrate, sodium acetate, urea, etc. Further, other know compounds causing the endothermic reaction with the reaction fluid may be used.

If the reaction material pouch 220 stores different cooling agents all together, each cooling agent may be separately wrapped to prevent the cooling agents from reacting with each other. That is, each cooling agent may be separately wrapped with a water-soluble film.

As shown in FIG. 4, the first pack 200 accommodates the reaction material pouch 220 and the reaction fluid pouch 210, and is disposed to exchange heat with the second pack 400. The first pack 200 is provided for preventing the reaction fluid from leakage while the reaction material chemically reacts with the reaction fluid. At this time, the first pack 200 may further include an absorption member to prevent the reaction fluid from leakage. Tissue paper, a non-woven fabric, a sponge, etc. may be used as the absorption member.

The second pack 400 is attached to an edge region of the first pack 200 and forms a storage space S to store the article. The second pack 400 is sealed in the state that the article is contained therein, or opened with an opening 410 (refer to FIG. 2) through which the article is taken in and out. The temperature control pouch pack 100 according to an exemplary embodiment of the present invention comprises the opening 410 at a lower region thereof, but not limited thereto. Alternatively, the opening 410 may be provided at a lateral side of the second pack 400 as necessary. Further, the opening 410 may be opened/closed by a zipper or a button to reduce heat loss at the exothermic or endothermic reaction.

Meanwhile, the article to be stored in the second pack 400 includes one of food, beverages, a poultice for cooling a wound of the wounded, and a mask pack for skin care.

An example of how to use the temperature control pouch pack 100 with this configuration according to the first exemplary embodiment of the present invention is as follows. First, a user tears a notch 205 of the first pack 200 to expose the tearing member 211 to the outside. When the tearing member 211 is pressed, the reaction liquid pouch 210 is torn so that the reaction liquid and the reaction material are chemically reacted with each other, thereby causing the endothermic reaction or the exothermic reaction. Accordingly, the inside temperature of the first pack 200 increases or decreases, thereby increasing or decreasing the temperature of the article filled in the second pack 400 being in heat-exchangeable contact with the first pack 200.

As described above, the temperature control pouch pack 100 according to an exemplary embodiment of the present invention integrally accommodates the article therein, and is thus convenient for a user to carry it. Further, the heat or the cold generated by the chemical reaction between the reaction fluid and the reaction material can be rapidly transferred to the second pack contacting the first pack, so that the article can quickly reach a desired temperature.

Meanwhile, FIGS. 5 through 8 are perspective views and sectional views of a temperature control pouch pack 100a according to a second exemplary embodiment of the present invention. Here, repetitive descriptions to the temperature control pouch pack 100 according to the first exemplary embodiment will be avoided as necessary.

As shown therein, the temperature control pouch pack 100a according to the second exemplary embodiment of the present invention further includes a third pack 300 opposite to a first pack 200 with a second pack 400 therebetween to accommodate the article.

Like the first pack 200, the third pack 300 includes a reaction fluid pouch 310 to be filled with a reaction fluid, and a reaction material pouch 320 to be filled with a reaction material. The reaction material pouch 320 is arranged to contact the article of the second pack 400.

Figure 6:
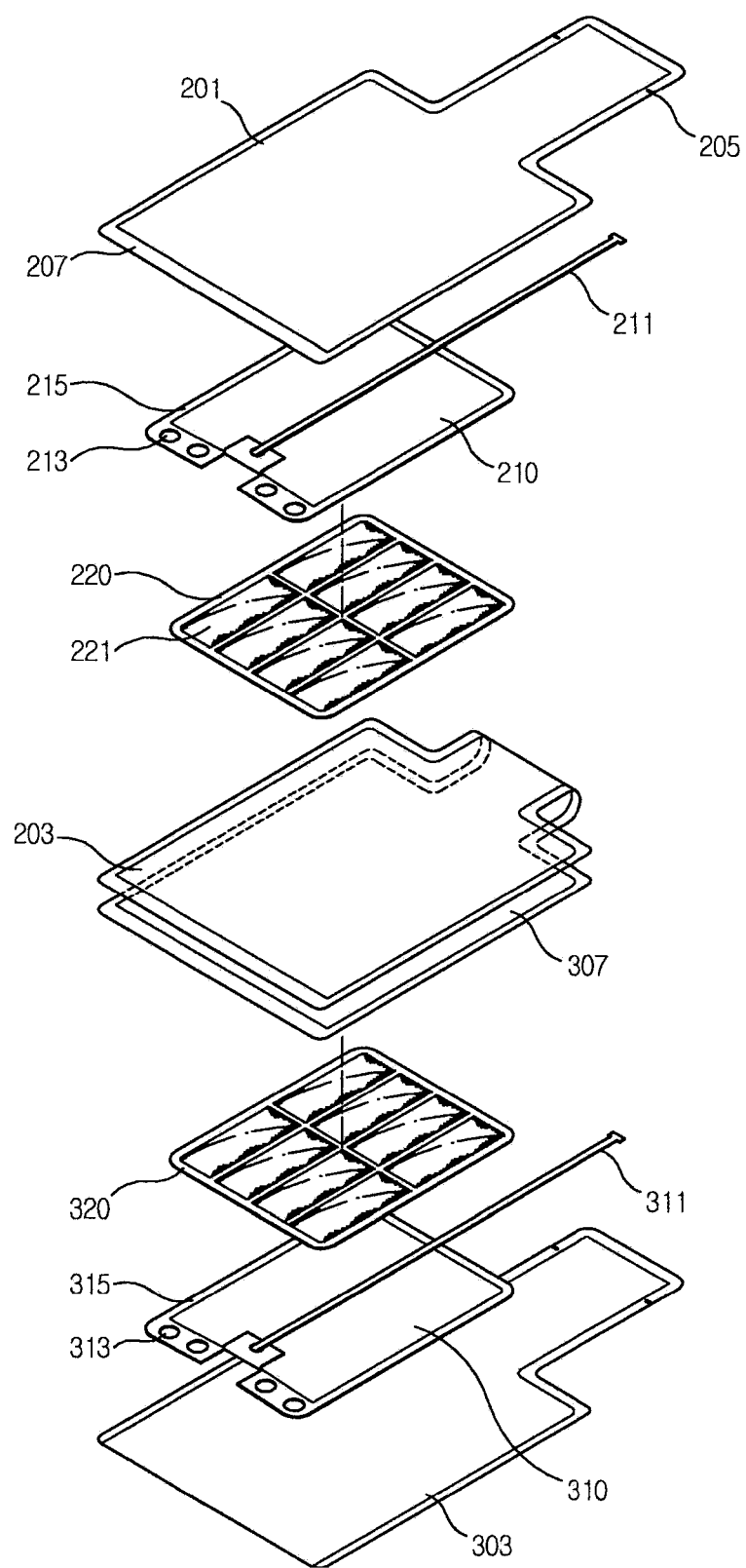
FIG. 6 is a an exploded perspective view showing the configuration of the temperature control pouch pack according to the second exemplary embodiment of the present invention in FIG. 5.
Figure 7:
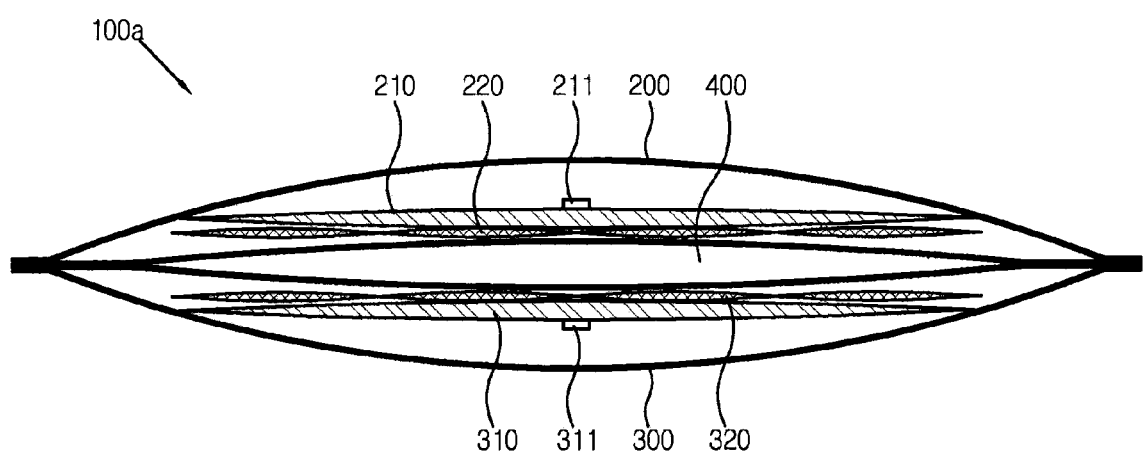
FIG. 7 is a sectional view taken along line VII-VII of FIG. 5.

Further, the temperature control pouch pack 100a according to the second exemplary embodiment includes through holes 213 and 313 provided in edges 215 and 315 of the reaction fluid pouch 210 and 310 (refer to FIG. 6).

Figure 8:
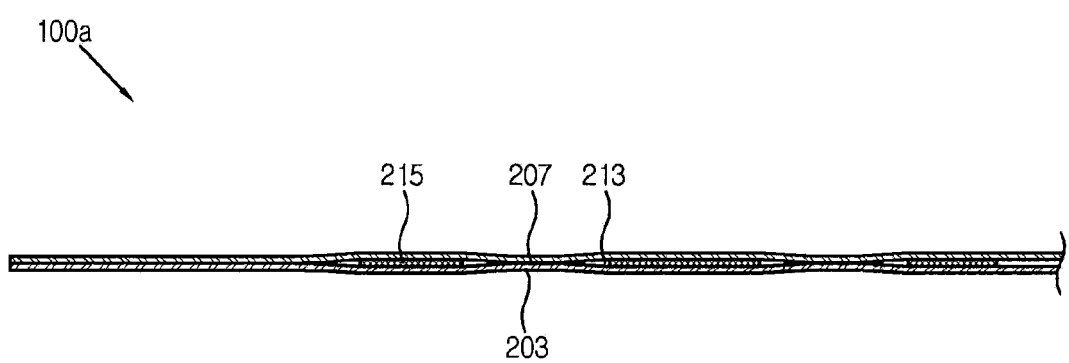
FIG. 8 is a sectional view taken along line VIII-VIII of FIG. 5.
Figure 9:
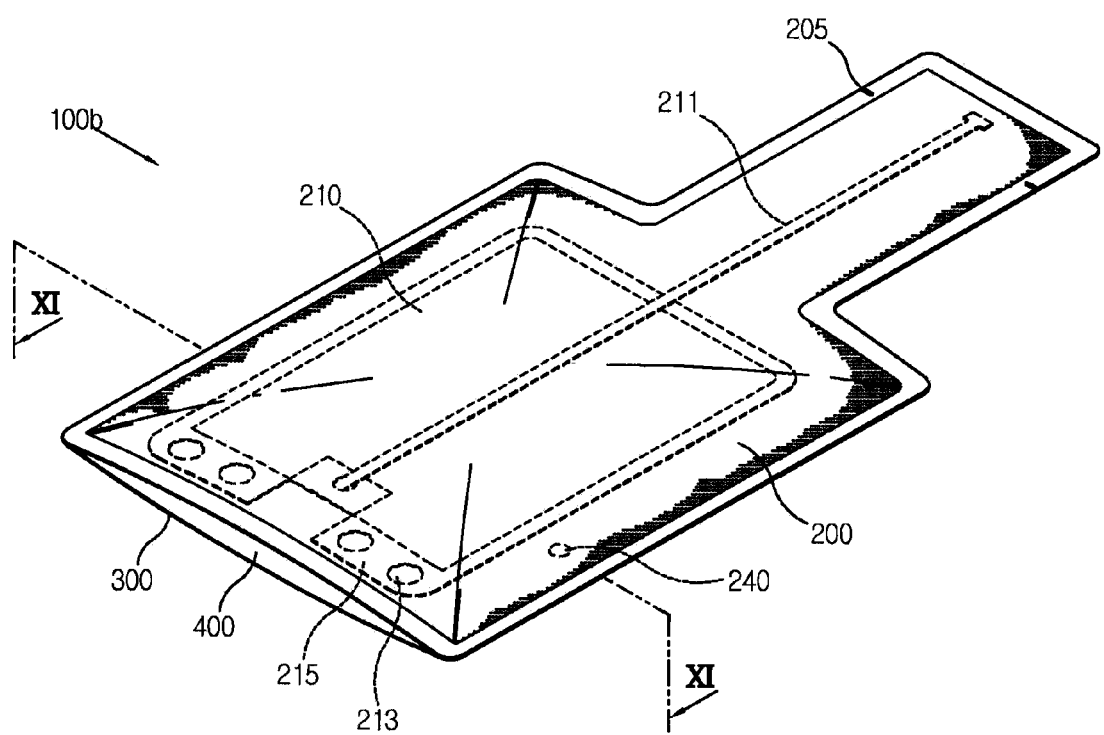
FIG. 9 is a perspective view showing a configuration of a temperature control pouch pack according to a third exemplary embodiment of the present invention.
Figure 10:
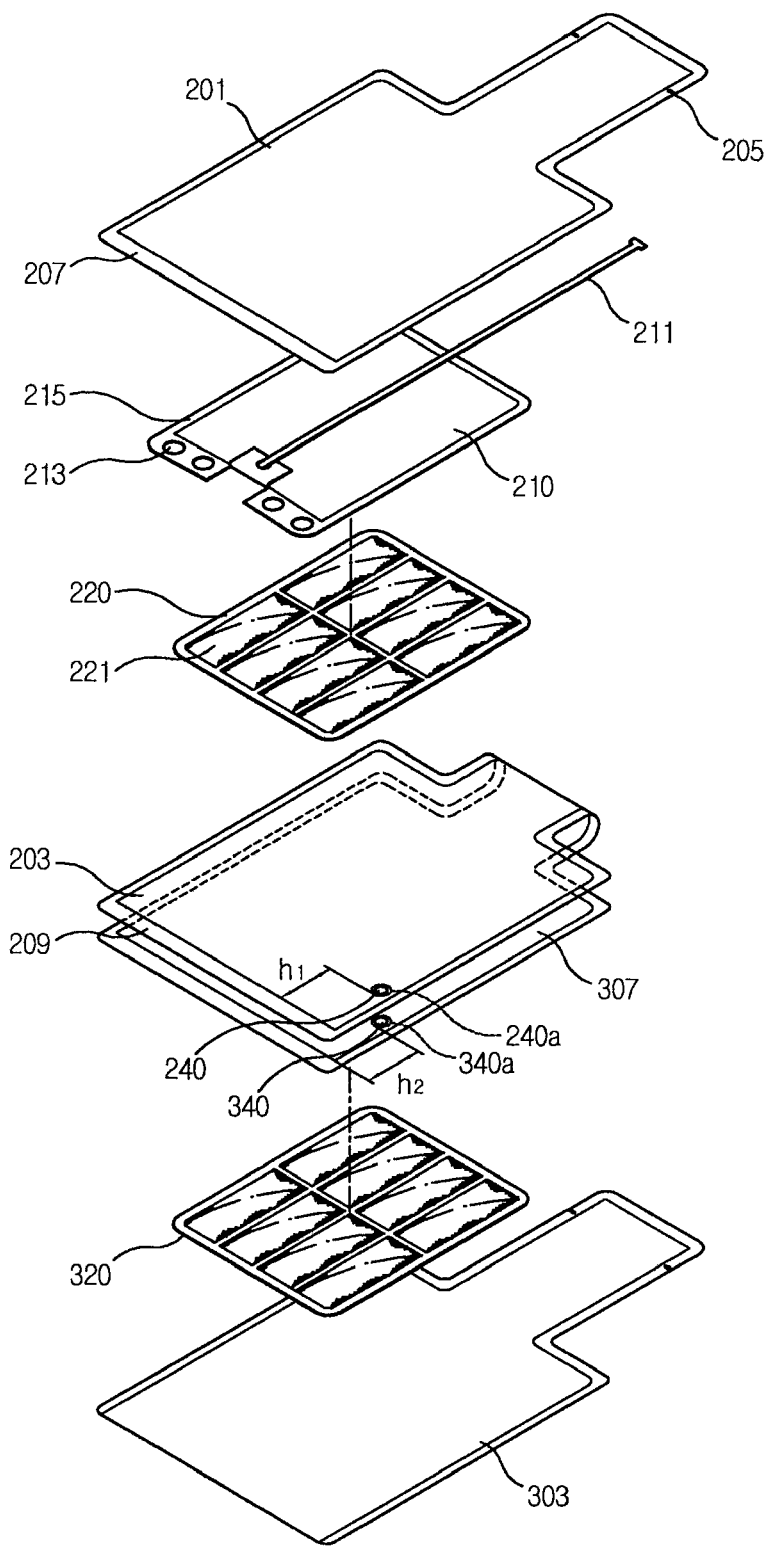
FIG. 10 is an exploded perspective view of the configuration of the temperature control pouch pack according to the third exemplary embodiment of the present invention.

The through hole 213 is provided in the edge 215 and facilitates adhesion between an interior cover 203 and an exterior cover 207 of a first pack pouch 201 accommodating the reaction fluid pouch 210. That is, as shown in FIG. 8, when the interior cover 203 and the exterior cover 207 of the first pack pouch 201 are adhered to each other, the interior cover 203 and the exterior cover 207 are in direct contact with each other through the through hole 213, so that adhesive efficiency thereof increases and the interior cover 203 and the exterior cover 207 are prevented from separating from each other.

Further, the through hole 213 is provided between the interior cover 203 and the exterior cover 207 when the interior cover 203 and the exterior cover 207 are adhered to each other. Accordingly, the position of the reaction fluid pouch 210 is kept even though the reaction fluid pouch 210 is torn by pressing the tearing member 211.

The size and the number of the through hole 213 may vary depending on the size, the thickness, the material, etc. of the first pack pouch 201. For adhesive efficiency, the through hole 213 may be plural.

In the temperature control pouch pack 100a with this configuration according to the second exemplary embodiment of the present invention, opposite sides of the article accommodated in the second pack 400 are surrounded with both the first pack 200 and the third pack 300, and the article is cooled by the chemical reactions at both sides, so that it takes relatively short time to the control temperature of the article as compared with the temperature control pouch pack 100 according to the first exemplary embodiment. Further, the positions of the reaction fluid pouches 210 and 310 are kept by the through holes 213 and 313 provided in the reaction fluid pouches 210 and 310 even though the tearing members 211 and 311 are pull out.

In the meantime, FIGS. 9 through 12 are perspective views and a sectional view of a temperature control pouch pack 100b according to a third exemplary embodiment of the present invention. As shown therein, the temperature control pouch pack 100b according to the third exemplary embodiment of the present invention includes a second pack 400 to accommodate the article; a first pack 200 provided at one side of the second pack 400 and accommodating a reaction fluid pouch 210 filled with a reaction fluid and a reaction material pouch 220 filled with a reaction material; and a third pack 300 provided at the other side of the second pack 400, communicating with the first pack 200 and accommodating a reaction material pouch 320 filled with a reaction material.

The first pack 200 includes the reaction fluid pouch 210 to be torn by pressure of a user, and the reaction material pouch 220 to chemically react with the reaction fluid. The first pack 200 includes an outlet hole 240 which is formed by perforating one surface 208 of a wrapping contacting the third pack 300 and through which the reaction fluid leaking from the torn reaction fluid pouch 210 flows out.

Figure 11:
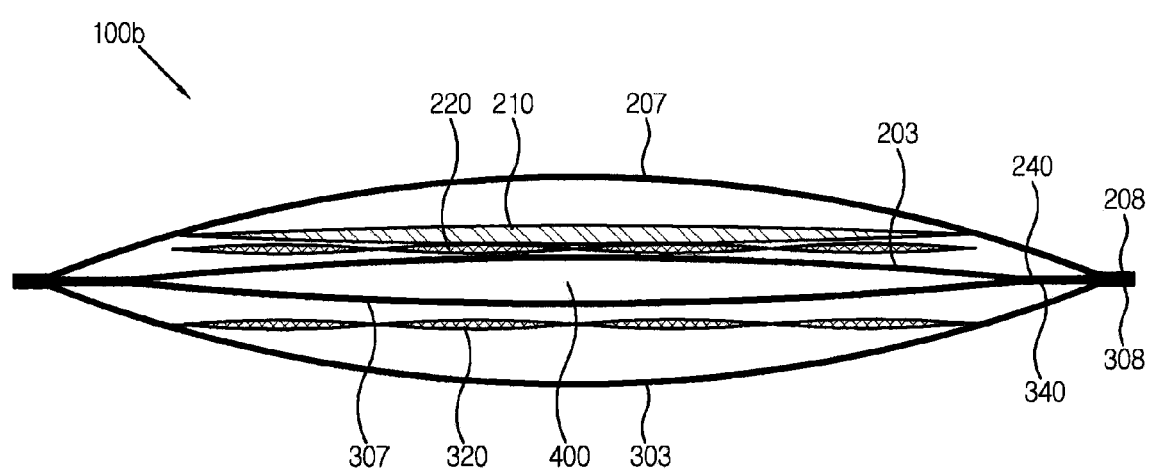
FIG. 11 is a sectional view taken along line XI-XI of FIG. 9.

Further, an inlet hole 340 is formed on a predetermined region 308 of the third pack 300 in correspondence with the outlet hole 240 of the first pack 200 and allows the reaction fluid leaking through the outlet hole 240 to flow therein. As shown in FIG. 11, the inlet hole 340 and the outlet hole 240 may be provided to make the reaction fluid directly flow therethrough. Additionally, sealing members (refer to "240a" and "340a" in FIG. 12) may be provided around the inlet hole 340 and the outlet hole 240 to prevent leakage of the reaction fluid.

Figure 12:
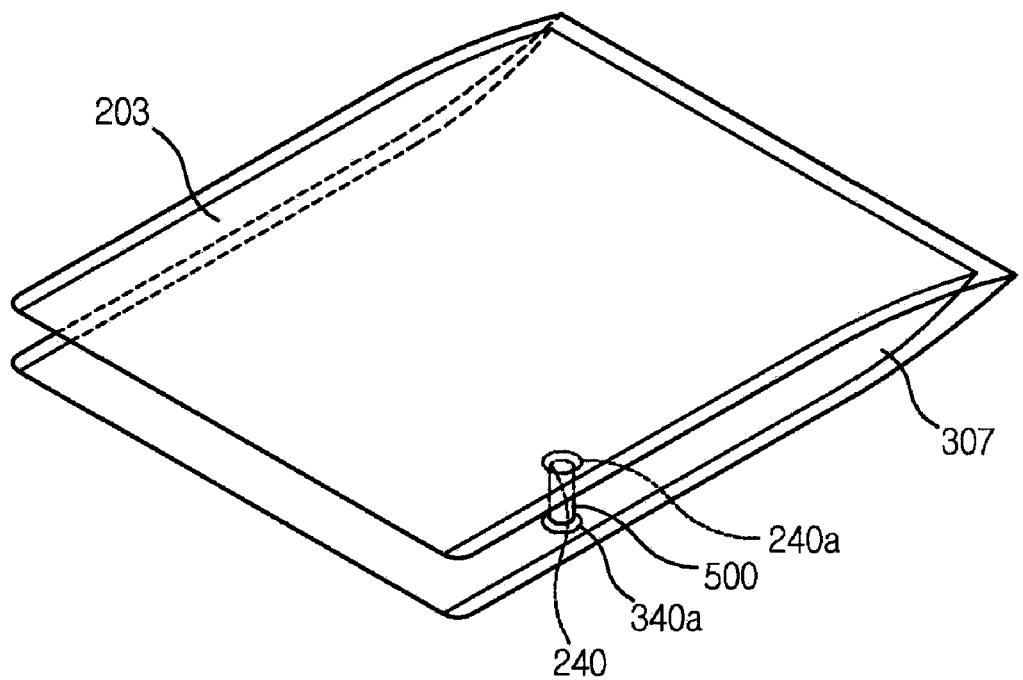
FIG. 12 is a perspective view of a temperature control pouch pack according to another exemplary embodiment of the present invention.

As shown in FIG. 12, a communicating member 500 may be separately provided for connecting the inlet hole 340 and the outlet hole 240, so that the reaction fluid can flow through the communicating member 500. Likewise, the sealing members 340a and 240a may be also provided around the inlet hole 340 and the outlet hole 240 to prevent the leakage of the reaction fluid, respectively.

The third pack 300 includes the reaction material pouch 320 filled with the reaction material to chemically react with the reaction fluid flowed in through the inlet hole 340.

Here, it is preferable but not necessary that the inlet hole 340 and the outlet 240 are placed in lower regions of the third pack 300 and the first pack 200, respectively. Accordingly, when the temperature control pouch pack 100b stands, the reaction fluid can flow in the third pack 300 at relatively high speed.

In the temperature control pouch pack 100b with this configuration according to the third exemplary embodiment of the present invention, when a user presses and tears the tearing member 211, the reaction fluid flows in both the first pack 200 and the third pack 300 and reacts with the reaction material. Thus, the article interposed between the first pack 200 and the third pack 300 is heated or cooled.

INDUSTRIAL APPLICABILITY

As described above, the temperature control pouch pack 100b according to the third exemplary embodiment of the present invention stores a smaller amount of the reaction fluid than that stored in the temperature control pouch pack 100a according to the second exemplary embodiment, so that total weight can decrease, thereby allowing a user to easily carry it.

In the second and third exemplary embodiments of the present invention, the first pack and the third pack are opposite to each other with the second pack accommodating the article therebetween, but not limited thereto. Alternatively, a fifth pack and a seventh pack may be added to be opposite to the first pack and the third pack, respectively, in order to cool or heat a plurality of articles at the same time.

The invention claimed is:

1. A temperature control pouch pack comprising:
a first pack which is filled with a first reaction fluid and a first reaction material which react with each other to cause a certain reaction while isolating one of the first reaction fluid and the first reaction material from the other one;
a second pack which is disposed to exchange heat with the first pack and accommodates an article of which temperature is in need of control; and
a third pack which is opposite to the first pack to interposed the second pack between the first pack and the third pack, and communicates with the first pack, wherein the third pack is filled with a second reaction material which reacts with the first reaction fluid flowed out from the first pack and causes a predetermined reaction,
wherein the first pack comprises an outlet hole through which the first reaction fluid flows out,
wherein the third pack comprises an inlet hole through which the first reaction fluid flows in, and
wherein a communicating member connected to the outlet hole and the inlet hole is disposed in the second pack such that the first reaction fluid flows therethrough.

2. The temperature control pouch pack according to claim 1, wherein the third pack further comprises a second reaction fluid which reacts with the second reaction material to cause a predetermined reaction.

3. The temperature control pouch pack according to claim 1, wherein
the second pack comprises an opening through which the article is taken in and out, and
the opening is provided at a lower region or a lateral side of the second pack.

4. The temperature control pouch pack according to claim 2, wherein the first pack and the third pack comprise a reaction fluid pouch to accommodate the reaction fluid, respectively.

5. The temperature control pouch pack according to claim 4, wherein the reaction fluid pouches of the first pack and the third pack comprises a tearing member on a surface thereof to be torn by pressure.

6. A temperature control pouch pack comprising:
a first pack which is filled with a predetermined reaction fluid and a reaction material which react with each other to cause a certain reaction while the reaction fluid and the reaction material are isolated from each other; and
a second pack which is disposed to exchange heat with the first pack and accommodates an article of which temperature is in need of control,
wherein the first pack comprises pack pouches to accommodate a reaction fluid pouch and a reaction material pouch,
wherein each of the pack pouches has an interior cover and an exterior cover which are adhered to each other at an adhesive edge, and
wherein the reaction fluid pouch comprises an edge which is interposed between the adhesive edge of the interior cover and the adhesive edge of the exterior cover, at least one through hole is formed on the edge of the reaction fluid pouch, and the through hole allows the interior cover and the exterior cover to contact with and to be adhered to each other therethrough.

7. The temperature control pouch pack according to claim 6, wherein the pack pouches are adhered to each other by one of thermal bolding, high frequency bonding and adhesive.

8. The temperature control pouch pack according to claim 1, wherein the first pack and the third pack respectively comprise a first reaction material pouch and the second reaction material pouch which absorbs the reaction fluid and are partitioned into a plurality of regions.

9. The temperature control pouch pack according to claim 1, wherein the outlet hole of the first pack and the inlet hole of the third pack are in contact with each other so that the reaction fluid communicates with the inlet hole via the outlet hole.

10. The temperature control pouch pack according to claim 1, further comprising a communicating member which connects the outlet hole of the first pack and the inlet hole of the third pack and through which the reaction fluid flows.

11. The temperature control pouch pack according to claim 1, further comprising a sealing member which is provided around the outlet hole of the first pack and the inlet hole of the third pack and prevents the reaction fluid from leaking while flowing.

12. The temperature control pouch pack according to claim 1, wherein the first pack and the third pack comprise an adhesion region where they are adhered to each other, and
the outlet hole and the inlet hole are adjacent to the adhesion region.

13. The temperature control pouch pack according to claim 12, wherein the outlet hole and the inlet hole are placed in lower regions of the first pack and the third pack.

14. The temperature control pouch pack according to any claim 1, wherein the certain reaction is an endothermic reaction, and
the first reaction material and the second reaction material include at least one of ammonium nitrate (NH4NO3) and sodium acetate (NaOAc).

15. The temperature control pouch pack according to claim 14, wherein the first reaction material and the second reaction material include urea.

16. The temperature control pouch pack according to claim 1, wherein the certain reaction is an exothermic reaction, and
the first reaction material and the second reaction material include at least one of a metallic heating element and calcium oxide.

17. The temperature control pouch pack according to claim 6, wherein the reaction fluid pouch comprises a tearing member on a surface thereof to be torn by pressure.

18. The temperature control pouch pack according to claim 6, further comprising a third pack which is opposite to the first pack to interpose the second pack between the first pack and the third pack.

* * * * *